(12) United States Patent
Newville et al.

(10) Patent No.: US 11,668,434 B2
(45) Date of Patent: Jun. 6, 2023

(54) DISPLAY MOUNT ASSEMBLY

(71) Applicant: MANEHU PRODUCT ALLIANCE, LLC, Carlsbad, CA (US)

(72) Inventors: Brian Newville, San Diego, CA (US); Mark Sullivan, Houston, TX (US)

(73) Assignee: MANEHU PRODUCT ALLIANCE, LLC, Carlsbad, CA (US)

( * ) Notice: Subject to any disclaimer, the term of this patent is extended or adjusted under 35 U.S.C. 154(b) by 94 days.

(21) Appl. No.: 16/918,718

(22) Filed: Jul. 1, 2020

(65) Prior Publication Data

US 2020/0355319 A1 Nov. 12, 2020

Related U.S. Application Data

(63) Continuation of application No. 16/033,972, filed on Jul. 12, 2018, now Pat. No. 10,738,941.
(Continued)

(51) Int. Cl.
*F16M 13/02* (2006.01)
*F16M 11/24* (2006.01)
(Continued)

(52) U.S. Cl.
CPC ........ *F16M 13/022* (2013.01); *F16M 11/046* (2013.01); *F16M 11/08* (2013.01);
(Continued)

(58) Field of Classification Search
CPC ....................................................... G05D 3/20
See application file for complete search history.

(56) References Cited

U.S. PATENT DOCUMENTS 2,090,439 A 8/1937 Carwardine
2,630,854 A 3/1953 Neher
(Continued)

FOREIGN PATENT DOCUMENTS

| CN | 111031859 A | 4/2020 |
| GB | 2222939 A | 3/1990 |
| WO | 2019043670 | 3/2019 |

OTHER PUBLICATIONS

ISA, International Search Report and Written Opinion for International Application No. PCT/IB2018/57591, dated Jan. 29, 2019.
(Continued)

*Primary Examiner* — Nkeisha Smith
(74) *Attorney, Agent, or Firm* — Perkins Coie LLP

(57) ABSTRACT

A TV wall mounting device includes a wall mount box with vertical supports, a display mount receiving a TV, and an extending/contracting portion between the box and the display mount. The extending/contracting portion has lower and upper arms rotatably attached to the wall mount with rear axles, a pair of linear actuators rotatably attached to the wall mount, a front portion that rises and lowers with action of the actuators, and a horizontally-swiveling portion that is raised and lowered with the front portion and is capable of rotating right-left with respect to the front portion. The display mount is attached to the horizontally-swiveling portion. Parallel operation of the linear actuators, wherein each actuator extends and retracts while keeping the same length as the other actuator, causes the display mount to go up and down. Differential operation of the actuators causes the display mount to rotate right and left.

18 Claims, 11 Drawing Sheets

Related U.S. Application Data

(60) Provisional application No. 62/553,961, filed on Sep. 4, 2017.

(51) Int. Cl.

| | | |
|---|---|---|
| *F16M 11/20* | (2006.01) | |
| *F16M 11/04* | (2006.01) | |
| *F16M 11/08* | (2006.01) | |
| *F16M 11/18* | (2006.01) | |
| *G05D 3/20* | (2006.01) | |
| *H04N 5/655* | (2006.01) | |
| *H04N 5/63* | (2006.01) | |

(52) U.S. Cl.
CPC ......... *F16M 11/18* (2013.01); *F16M 11/2021* (2013.01); *F16M 11/2092* (2013.01); *F16M 11/24* (2013.01); *F16M 13/02* (2013.01); *G05D 3/20* (2013.01); *F16M 2200/063* (2013.01); *H04N 5/63* (2013.01); *H04N 5/655* (2013.01)

(56) References Cited

U.S. PATENT DOCUMENTS

| | | | |
|---|---|---|---|
| 4,076,351 A | 2/1978 | Wvant | |
| 4,082,244 A | 4/1978 | Groff | |
| 4,561,674 A | 12/1985 | Alessio | |
| 4,691,886 A | 9/1987 | Wendlinq | |
| 5,037,054 A | 8/1991 | McConnell | |
| 5,108,063 A | 4/1992 | Koerber, Sr. et al. | |
| 5,224,677 A | 7/1993 | Close | |
| 5,299,993 A | 4/1994 | Habinq | |
| 5,499,956 A | 3/1996 | Habinq | |
| 5,560,501 A | 10/1996 | Rupert | |
| 5,738,316 A | 4/1998 | Sweere | |
| 5,743,503 A | 4/1998 | Voeller et al. | |
| 5,826,846 A | 10/1998 | Buccieri et al. | |
| 5,857,756 A | 1/1999 | Fehre | |
| 5,876,008 A | 3/1999 | Sweere | |
| 6,065,725 A | 5/2000 | Mason | |
| 6,065,909 A | 5/2000 | Cook | |
| 6,105,909 A | 8/2000 | Wirth et al. | |
| 6,419,196 B1 | 7/2002 | Sweere | |
| 6,523,796 B2 | 2/2003 | Abramaowskv | |
| 6,592,090 B1 | 7/2003 | Li | |
| 6,695,274 B1 | 2/2004 | Chiu | |
| 6,889,404 B2 | 5/2005 | Lu | |
| 6,905,101 B1 | 6/2005 | Dittmer | |
| 6,983,917 B2 | 1/2006 | Oddsen, Jr. | |
| 7,014,157 B2 | 3/2006 | Oddsen | |
| 7,061,753 B2 | 6/2006 | Michoux et al. | |
| 7,252,277 B2 | 8/2007 | Sweere | |
| 7,290,744 B2 | 11/2007 | Baldasari | |
| 7,300,029 B2 | 11/2007 | Petrick | |
| 7,395,996 B2 | 7/2008 | Dittmer | |
| 7,398,950 B2 | 7/2008 | Hung | |
| 7,448,584 B2 | 11/2008 | Chen et al. | |
| 7,546,745 B2 | 6/2009 | Lee | |
| 7,546,994 B2 | 6/2009 | Altonji et al. | |
| 7,663,868 B1 | 2/2010 | Lam | |
| 7,854,415 B2 | 12/2010 | Holbrook et al. | |
| 7,866,622 B2 | 1/2011 | Dittmer | |
| 7,950,613 B2 | 5/2011 | Anderson et al. | |
| 8,006,440 B2 * | 8/2011 | Thomas | A61G 12/005 248/278.1 |
| 8,074,950 B2 | 12/2011 | Clary | |
| 8,094,438 B2 | 1/2012 | Dittmer et al. | |
| 8,382,052 B1 | 2/2013 | Mathieson et al. | |
| 8,724,037 B1 * | 5/2014 | Massey | F16M 11/18 348/836 |
| 8,740,164 B2 | 6/2014 | Tachibana | |
| 8,864,092 B2 * | 10/2014 | Newville | F16M 13/02 361/679.01 |
| 8,960,632 B2 | 2/2015 | Fallows | |
| 9,004,430 B2 | 4/2015 | Conner | |
| 9,016,648 B2 | 4/2015 | Smeenk | |
| 9,265,346 B1 | 2/2016 | Forney | |
| 9,625,091 B1 * | 4/2017 | Massey | F16M 11/04 |
| 9,876,984 B2 | 1/2018 | Massey | |
| 9,999,557 B2 * | 6/2018 | Diaz-Flores | G16H 20/30 |
| 10,139,045 B1 | 11/2018 | Keuter | |
| 10,257,460 B2 | 4/2019 | Massey | |
| 10,277,860 B2 | 4/2019 | Massey | |
| 10,281,080 B1 | 5/2019 | Massey | |
| 10,659,279 B2 * | 5/2020 | Chiu | H04L 29/06401 |
| 10,738,941 B2 | 8/2020 | Newville | |
| 10,859,201 B2 | 12/2020 | Newville | |
| 10,935,180 B1 | 3/2021 | Massey | |
| 2002/0043978 A1 | 4/2002 | McDonald | |
| 2002/0100851 A1 | 8/2002 | Abramaowsky | |
| 2002/0179791 A1 | 12/2002 | Kwon | |
| 2004/0084587 A1 | 5/2004 | Oddsen | |
| 2005/0010911 A1 | 1/2005 | Childrey | |
| 2005/0152102 A1 | 7/2005 | Shin | |
| 2005/0204645 A1 | 9/2005 | Bachinski | |
| 2005/0236543 A1 | 10/2005 | O'Neil | |
| 2005/0284997 A1 | 12/2005 | Tisbo et al. | |
| 2006/0070210 A1 | 4/2006 | Amdahl | |
| 2006/0077622 A1 | 4/2006 | Keely et al. | |
| 2006/0102819 A1 * | 5/2006 | Li | F16M 11/2064 248/280.11 |
| 2007/0023599 A1 | 2/2007 | Fedewa | |
| 2007/0030405 A1 | 2/2007 | Childrey et al. | |
| 2007/0040084 A1 | 2/2007 | Sturman et al. | |
| 2007/0221807 A1 | 9/2007 | Park | |
| 2007/0252056 A1 | 11/2007 | Novin | |
| 2008/0078906 A1 | 4/2008 | Hung | |
| 2008/0237424 A1 | 10/2008 | Clary | |
| 2009/0034178 A1 | 2/2009 | Le | |
| 2009/0050763 A1 | 2/2009 | Dittmer | |
| 2009/0108158 A1 | 4/2009 | Kim et al. | |
| 2009/0206221 A1 | 8/2009 | Timm et al. | |
| 2009/0212669 A1 | 8/2009 | Robert-Reitman et al. | |
| 2010/0006725 A1 | 1/2010 | Kim et al. | |
| 2010/0052847 A1 | 3/2010 | Mortensen | |
| 2010/0091438 A1 | 4/2010 | Dittmer | |
| 2010/0149736 A1 | 6/2010 | Zhang et al. | |
| 2010/0155558 A1 | 6/2010 | Zhang et al. | |
| 2010/0171013 A1 | 7/2010 | Anderson et al. | |
| 2011/0043978 A1 | 2/2011 | Bremmon et al. | |
| 2011/0234926 A1 | 9/2011 | Smith | |
| 2012/0032062 A1 * | 2/2012 | Newville | F16M 13/02 248/575 |
| 2012/0033371 A1 | 2/2012 | Pankros et al. | |
| 2012/0061543 A1 | 3/2012 | Juan | |
| 2012/0167486 A1 | 7/2012 | Lee | |
| 2013/0082156 A1 | 4/2013 | Conner | |
| 2013/0176667 A1 | 7/2013 | Kulkami et al. | |
| 2013/0187019 A1 | 7/2013 | Dittmer et al. | |
| 2014/0211100 A1 | 7/2014 | Massey | |
| 2015/0277214 A1 | 10/2015 | Schuh | |
| 2018/0054156 A1 * | 2/2018 | Lokey | G05D 3/105 |
| 2018/0131895 A1 | 5/2018 | Massey | |
| 2018/0310459 A1 * | 11/2018 | Blunier | A01B 63/22 |
| 2019/0072231 A1 * | 3/2019 | Newville | G05D 3/20 |
| 2019/0335135 A1 | 10/2019 | Massey | |

OTHER PUBLICATIONS

ISA, International Preliminary Report on Patentability for International Application No. PCT/IB2018/57591, dated Mar. 10, 2020.

* cited by examiner

DISPLAY MOUNT ASSEMBLY

CROSS-REFERENCE TO RELATED APPLICATION(S)

This application claims priority from and is a continuation of U.S. patent application Ser. No. 16/033,972, entitled DISPLAY MOUNT ASSEMBLY, filed Jul. 12, 2018, (U.S. Pat. No. 10,738,941), which claims priority from U.S. provisional patent application Ser. No. 62/553,961, entitled DROP DOWN TELEVISION MOUNTING SYSTEM, filed on Sep. 4, 2017. Each of these patent documents is hereby incorporated by reference in its entirety as if fully set forth herein, including text, figures, claims, tables, and computer program listing appendices (if present), and all other matter in the patent documents.

TECHNICAL FIELD

This document generally relates to the field of retractable/extendable mounts for appliances. More particularly, this document relates to retractable/extendable wall mounts for displays such as television sets (TVs).

BACKGROUND

A good mounting place for a large flat screen display (such as a TV) is often high on a wall, for example, above a fireplace. Such mounting location may make it necessary or desirable to lower the display for user watching from a convenient location in a room. In the course of lowering the TV, it may need to clear an obstacle, for example, a fireplace below the mounting location. The force for lowering and raising the TV may be provided, for example, by linear actuators.

It is desirable to allow convenient watching of the TV from some angle, that is, for user watching positions that are not necessarily directly in front of the wall mount. Towards this end, a swiveling mechanism may be included to provide for right-left swiveling with respect to the TV's vertical axis. Borrowing from aeronautics (Tait-Bryan angles) and analogizing the TV to an aircraft with its nose pointing in the direction normal to the screen and pointing away from the wall, the swiveling would provide yaw or heading adjustment; we can alternatively call the angle that the axis normal to screen would form with an axis normal to the wall an "azimuth," "azimuth angle," "swivel position," or "swivel angle."

Typically, when the TV is raised, it should end up substantially flat against the wall with portions of the wall mount assembly retracted into the wall, so that the TV and the wall mount assembly do not protrude too far into the room. A residential wall may be about 3½ inches in thickness. Facilitating mounting of the wall mount mechanism inside such relatively thin walls may be important.

A wall mount assembly may be installed in a smart home or business, i.e., a building with various interconnected appliances, security systems, monitoring systems, and other interconnected electronic devices. Facilitating mounting and operation of wall mount assemblies in such buildings may be important.

A wall mount assembly may or may not have its own remote control device. It may be important, in some circumstances, to activate the wall mount without a separate remote control device. For wall mount assemblies with separate remote control devices, it may be desirable to facilitate installation of the receivers of the remote control devices and ensuring reliable operation of the remote control devices, regardless of the position of the TV.

A wall mount assembly may have a broader mechanical operational envelope than the particular installation environment allows, potentially causing the wall mount assembly and the TV mounted on it to collide with various items of the environment, such as a mantel/fireplace, side walls, furniture, and other obstructions. Facilitating mounting of wall mount assemblies in such locations and avoiding repeated bumping into environmental obstructions may be important.

When a wall mount assembly is installed above a fireplace, there is a danger that a fire will be lit in the fireplace, intentionally or not, while the unit is extended, causing the display mounted on the wall mount assembly to overheat and be destroyed. Facilitating safe mounting and operation of wall mount assemblies in such locations may be important.

Wall mount assemblies may need to accommodate various displays. Facilitating operation of wall mount assemblies with a range of display weights may also be important.

SUMMARY

A need in the art exists for new and better techniques and arrangements for mounting devices such as displays and TVs. A need in the art exists for thin wall mount assemblies for various devices, including displays and TVs. A need in the art exists for new and better techniques for wall mount assemblies that can communicate with smart home/business devices. A need in the art exists for wall mount assemblies that are automatically activated in response to changed ON/OFF states of the displays or TVs installed on the wall mount assemblies. A need in the art exists for wall mount assemblies with manually programmable stops (viewing positions) and programmable operational envelope limitations. A need in the art exists for wall mount assemblies with automatically-learned safety stops and operational mechanical envelope limitations. A need in the art exists for wall mount assemblies that prevent overheating of the displays/TVs installed on them. A need in the art exists for powered wall mount assemblies that can operate with displays/TVs of various weights.

Embodiments, variants, and examples described in this document are directed to apparatus and methods that may satisfy one or more of the above described needs and/or other needs.

In an embodiment, a mounting device (100) includes a wall mounting portion (120) configured to attach to a wall and comprising vertical support members (156A, 156B, 156C), a display mounting portion (130) configured to receive a display (110), and an extending/contracting portion (140) between the wall mounting portion and the display mounting portion. The extending/contracting portion includes the following components: a first lower arm (144A) having first lower arm rear and front ends; a second lower arm (144B) having second lower arm rear and front ends; a first upper arm (142A) having first upper arm rear and front ends; a second upper arm (142B) having second upper arm rear and front ends; a rear upper axle (141A) extending through the vertical support members and rotatably attaching the first upper arm at the first upper arm rear end and the second upper arm at the second upper arm rear end to the wall mounting portion; a rear lower axle (141B) parallel to the rear upper axle and extending through the wall mounting portion below the rear upper axle, the rear lower axle rotatably attaching the first lower arm at the first lower arm rear end and the second lower arm at the second lower arm rear end to the wall mounting portion; a first linear actuator (146) having rear and front ends, the first linear actuator rear end being rotatably attached to the wall mounting portion below the rear upper axle; a second linear actuator (148) having rear and front ends, the second linear actuator rear end being rotatably attached to the wall mounting portion below the rear upper axle; a left front vertical member (154A) having upper and lower ends; a right front vertical member (154B) having upper and lower ends; an upper horizontal front member (165A, 161A) having left and right ends, the upper horizontal front member left end being rotatably attached to the first upper arm front end and to the left front vertical member upper end, the upper horizontal front member right end being rotatably attached to the second upper arm front end and to the right front vertical member upper end; a lower horizontal front member (165B, 161B) having left and right ends, the lower horizontal front member left end being rotatably attached to the first lower arm front end and to the left front vertical member lower end, the lower horizontal front member right end being rotatably attached to the second lower arm front end and to the right front vertical member lower end; a vertical rod (158) attached to the upper horizontal front member midway between the upper horizontal front member left and right ends, and attached to the lower horizontal front member midway between the lower horizontal front member left and right ends; and a horizontally swiveling portion (159) including a vertical rotational component (159B), one or more horizontal attachment components (159A, 159C), and a joint attachment bar (159D) having a left actuator attachment joint (163A) connected to the first linear actuator front end and a right actuator attachment joint (163B) connected to the second linear actuator front end, the vertical rotational component configured to rotate right-left about the vertical rod together with the joint attachment bar in response to differential extension and contraction of the first and second linear actuators, the one or more horizontal attachment components configured to rotate right-left with the vertical rotational component and the joint attachment bar, the display mounting portion being configured to rotate right-left together with the one or more horizontal attachment components. The mounting device is configured to move the display mounting portion vertically in response to the first and second linear actuators parallel operation and rotate the display mounting portion right-left in response to the first and second linear actuators differential operation.

In aspects, the upper horizontal front member includes an upper front axle and an upper front tubular component surrounding the upper front axle, the lower horizontal front member includes a lower front axle and a lower front tubular component surrounding the lower front axle, and the vertical rotational component includes a tubular portion surrounding the vertical rod.

In aspects, the first linear actuator rear end is attached to the wall mounting portion forward of the rear upper axle, and the second linear actuator rear end is attached to the wall mounting portion forward of the rear upper axle.

In aspects, the second linear actuator is substantially the same as the first linear actuator, such as the same model or analogous model with similar or identical dimensions (particularly diameter/thickness within 10 percent) and similar or identical performance (force or weight lifting ability within 10 percent).

In aspects, the first linear actuator includes a first position sensor configured to indicate extension length of the first linear actuator, and the second linear actuator includes a second position sensor configured to indicate extension length of the second linear actuator.

In aspects, the mounting device further includes an electronic subsystem coupled to the first and second linear actuators to control extension and contraction of the first and second linear actuators, and to read the first and second position sensors.

In aspects, the first and second position sensors are or include hall effect sensors.

In aspects, the electronic subsystem includes a processing device and one or more memories, at least one of the one or more memories storing code executable by the processing device.

In aspects, the electronic subsystem further includes a remote control receiver coupled to the processing device to allow the processing device to read commands received by the remote control receiver from a handheld remote controller of the mounting device.

In aspects, the remote control receiver is an infrared receiver designed to receive the commands from the handheld remote controller through an infrared channel.

In aspects, the remote control receiver is a radio frequency (RF) receiver designed to receive the commands from the handheld remote controller through an RF channel.

In aspects, the code includes instructions to receive commands to change elevation and azimuth of the display mounting portion, and to provide drive to the first and second linear actuators to execute the commands.

In aspects, the code further includes instructions to memorize elevation and azimuth of the display mounting portion.

In aspects, the code further includes instructions to obtain readings of the first and second position sensors and to memorize elevation and azimuth of the display mounting portion based on the readings of the first and second position sensors.

In aspects, the code further includes instructions to receive commands to place the display mounting portion at the memorized elevation and azimuth, and to drive the first and second linear actuators so that the display mounting portion is placed in the memorized elevation and azimuth.

In aspects, the code further includes instructions to receive commands to memorize a soft stop at the memorized elevation and azimuth, and to prevent driving the first and second linear actuators beyond the memorized elevation and azimuth.

In aspects, the mounting device further includes means for automatically learning one or more soft stops.

In aspects, the mounting device further includes a temperature sensor, and the code further includes instructions to obtain readings of the temperature sensor and to drive the first and second linear actuators to retract the wall mounting portion in response to one or more of the readings exceeding a predetermined maximum temperature limit.

In an embodiment, a mounting device includes a wall mounting portion configured to attach to a wall and a display mounting portion configured to receive a display. The mounting device also includes an extending/contracting portion between the wall mounting portion and the display mounting portion, the extending contracting portion including one or more linear actuators, each linear actuator of the one or more linear actuators having a position sensor. The mounting device additionally includes a processing device and memory coupled to the processing device and storing machine executable code, the processing device being configured to control extension and contraction of the one or more linear actuators and to read the position sensors of the one or more linear actuators. The mounting device further includes an electrical subsystem configured to receive electrical power and to provide electrical power to the display mounted on the display mounting portion. The electrical subsystem includes a sensor of current consumed by the display. The sensor of the current is coupled to the processing device so that the processing device is configured to obtain readings of the current consumed by the display. The code includes instructions to implement means for identifying when the display is turned ON and placing the display mounting portion in a predetermined position in response to the display being turned ON. In aspects, the code further includes instructions to implement means for identifying when the display is turned OFF and retracting the display mounting portion in response to the display being turned OFF.

In an embodiment, a mounting device includes a wall mounting portion configured to attach to a wall, a display mounting portion configured to receive a display, and an extending/contracting portion between the wall mounting portion and the display mounting portion. The extending/contracting portion includes means for varying elevation and azimuth of the display mounting portion.

These and other features and aspects of selected embodiments, variants, and examples consistent with the present disclosure will be better understood with reference to the following description, drawings, and appended claims.

BRIEF DESCRIPTION OF THE DRAWINGS

FIG. 10 is a process flow diagram illustrating selected steps and decision blocks of a process for setting ON current threshold for determining when the display/TV mounted on the wall mount assembly such as the wall mount assembly of FIG. 1 is turned ON.

DETAILED DESCRIPTION

Figure 1:
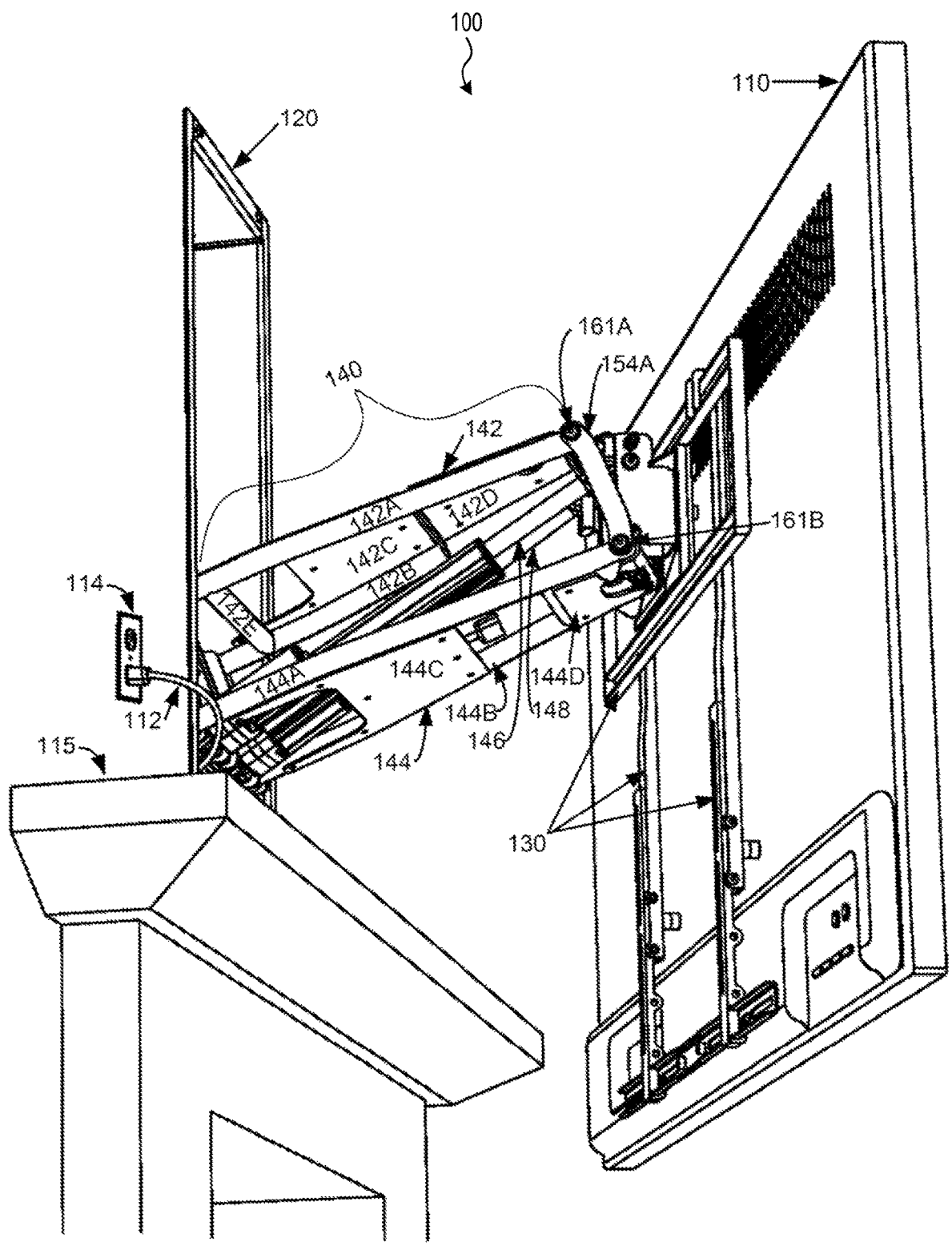
FIG. 1 is a lower left-side perspective view illustrating selected components of a display wall mount assembly with a TV mounted on it.

Reference will now be made in detail to one or more embodiments that are illustrated in the accompanying drawings, their features, and alternative embodiments. Same reference numerals are used in the drawings and the description to refer to the same apparatus elements and method steps (if applicable). The drawings are in simplified form, not necessarily to scale, and omit apparatus and articles of manufacture elements and method steps that can be added to the described apparatuses, articles of manufacture, and methods, while possibly including certain optional elements and steps. For purposes of convenience and clarity, directional terms, such as top, bottom, left, right, up, down, over, above, below, beneath, rear, and front, may be used with respect to the accompanying drawings. These and similar/analogous directional terms should not necessarily be construed to limit the scope of the invention(s). The reference to "right" and "left" are generally intended to refer to, respectively, the right side and left side of a user standing in front of the TV and facing the TV, in a viewing position. The references to "above" and "below" are generally intended to refer to, respectively, higher and lower position as in normal installation as shown in the drawings. The references to "front" and "rear" are generally intended to refer to, respectively, positions farther away from the wall and nearer the wall as in normal installation as shown in the drawings. The description of each Figure should be interpreted in conjunction with the Figure itself and with the other related Figures.

The words such as "connect," "couple," "attach," and similar terms with their inflections do not necessarily denote direct and immediate connections/attachments; they include within their meaning direct/immediate connections, couplings, and attachments; and also connections, couplings, attachments using intermediate elements or devices. This applies to electrical/electronic and mechanical connections.

The words "embodiment," "variant," "example," and similar words and expressions as used herein refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and do not necessarily strictly limit the invention(s) disclosed.

Some definitions have been explicitly provided above. Other and further explicit and implicit definitions and clarifications of definitions may be found throughout this document.

Figure 2:
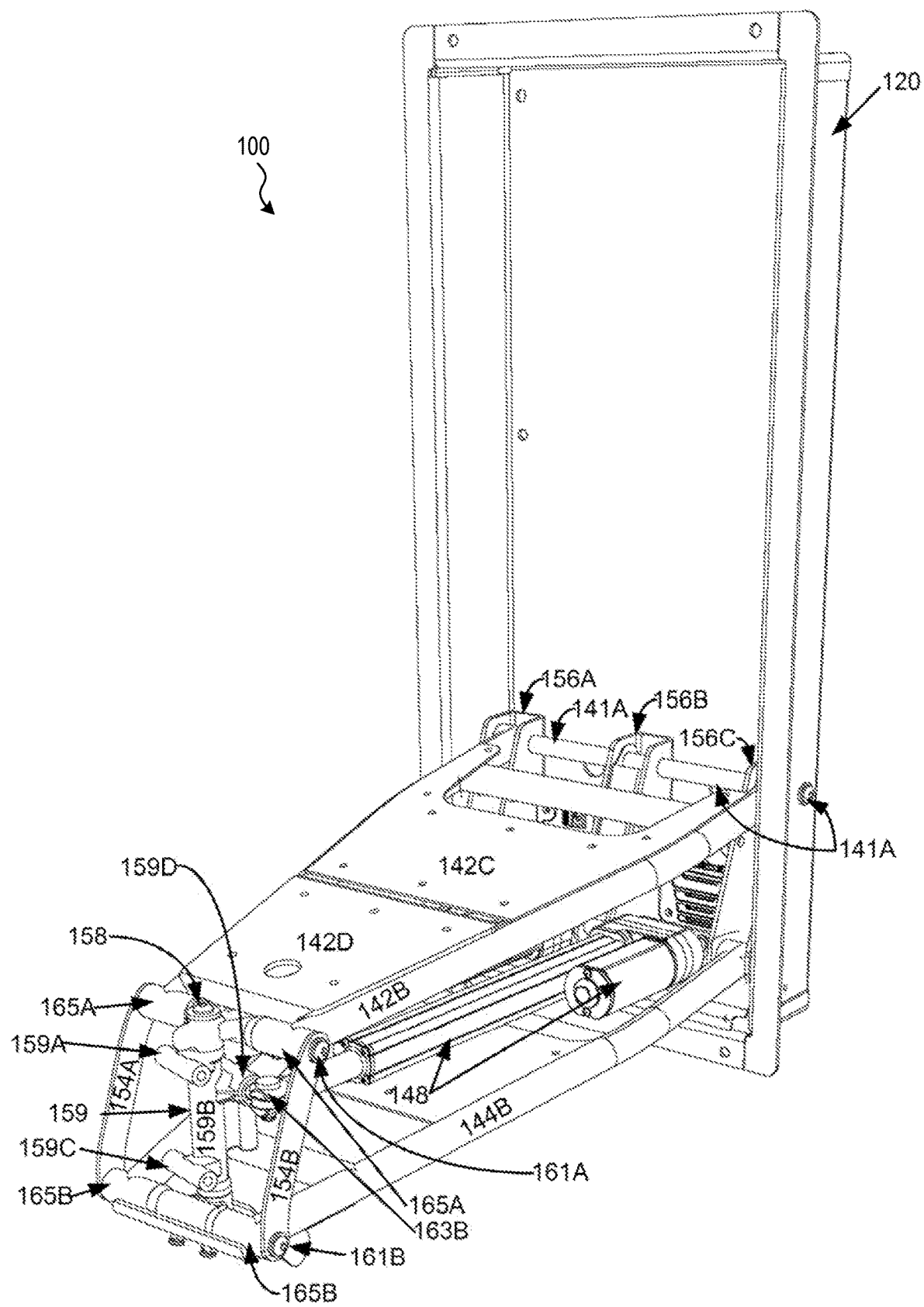
FIG. 2 is a front right-side perspective view of the wall mount assembly of FIG. 1 with certain parts removed.
Figure 3:
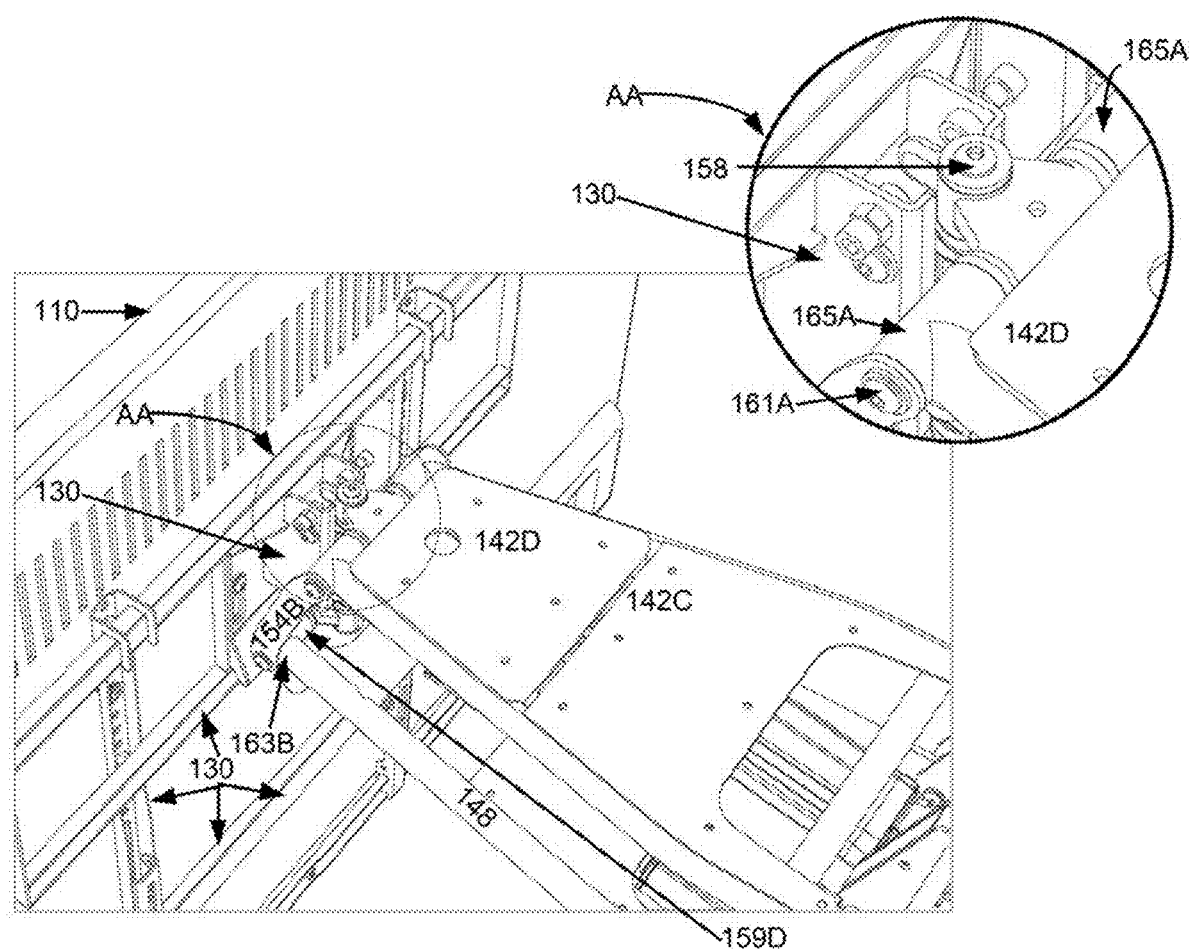
FIG. 3 is a partial upper rear right-side perspective view of the wall mount assembly of FIG. 1, with an inset magnifying certain elements.
Figure 4:
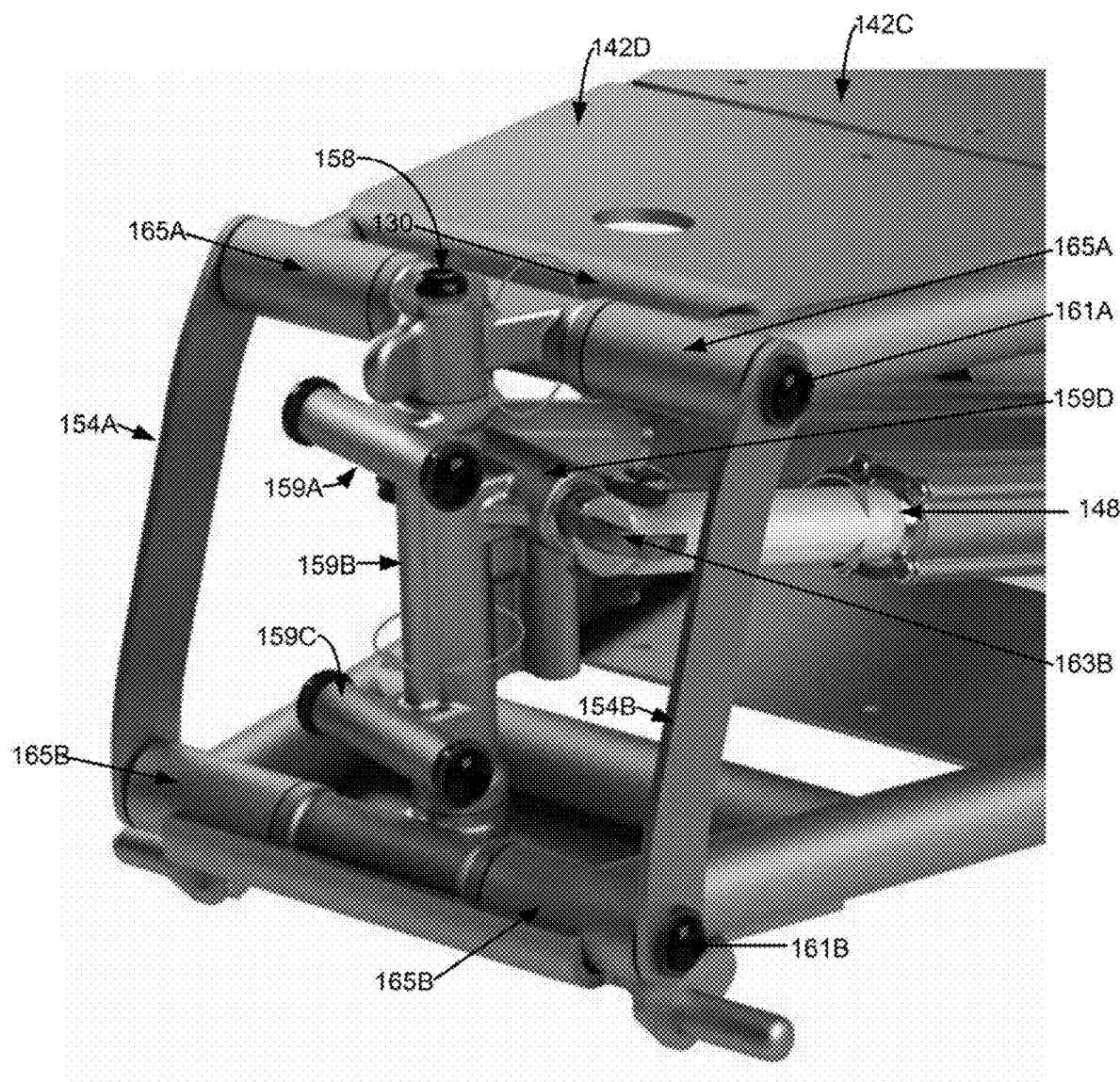
FIG. 4 is a partial right perspective view of a multi-axes hub of the mount assembly of FIG. 1.
Figure 5:
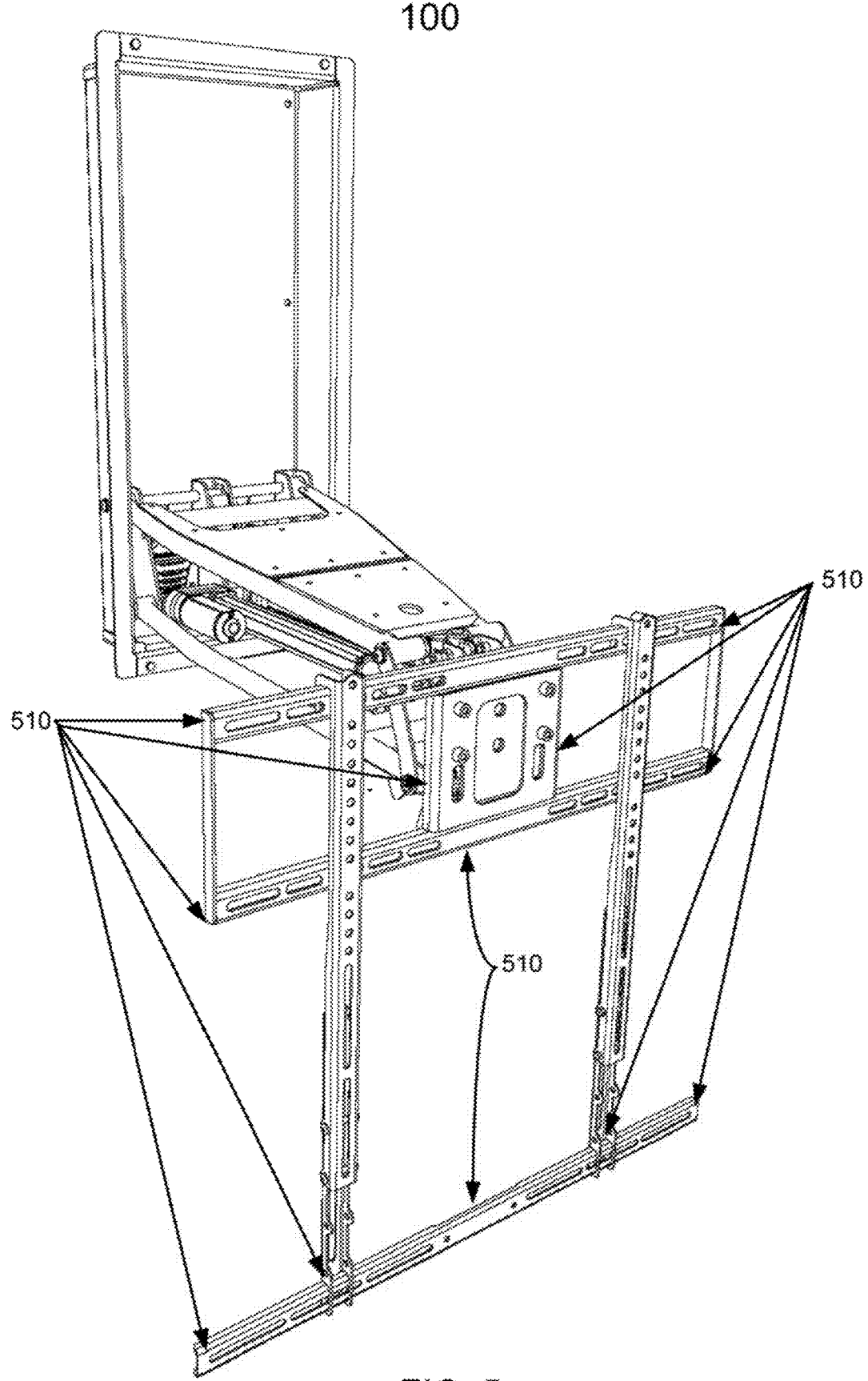
FIG. 5 is a front left-side perspective view of the wall mount assembly of FIG. 1, in an extended/lowered configuration and without the TV.
Figure 6:
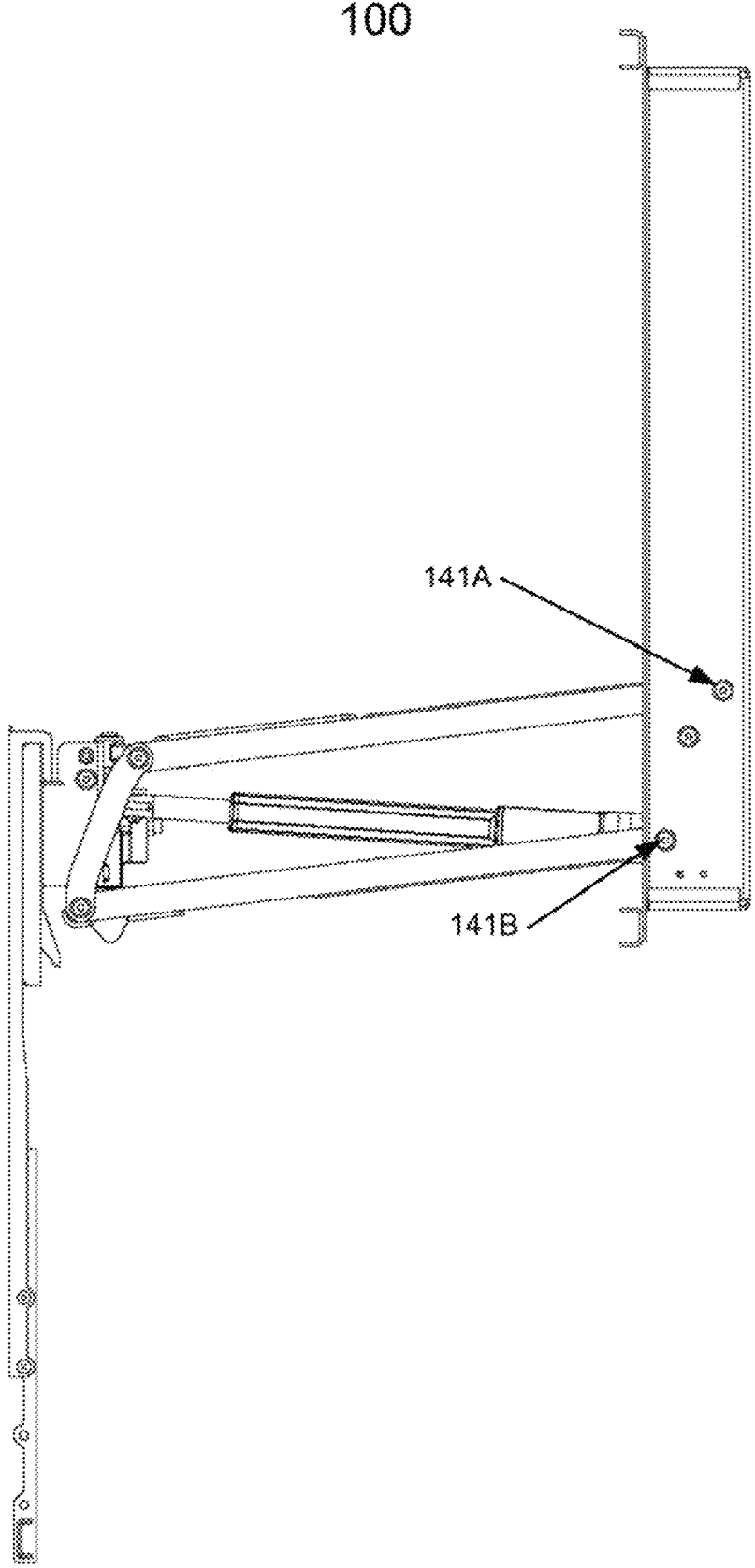
FIG. 6 is a right-side plan view of the wall mount assembly of FIG. 1, in the extended/lowered configuration and without the TV.
Figure 7:
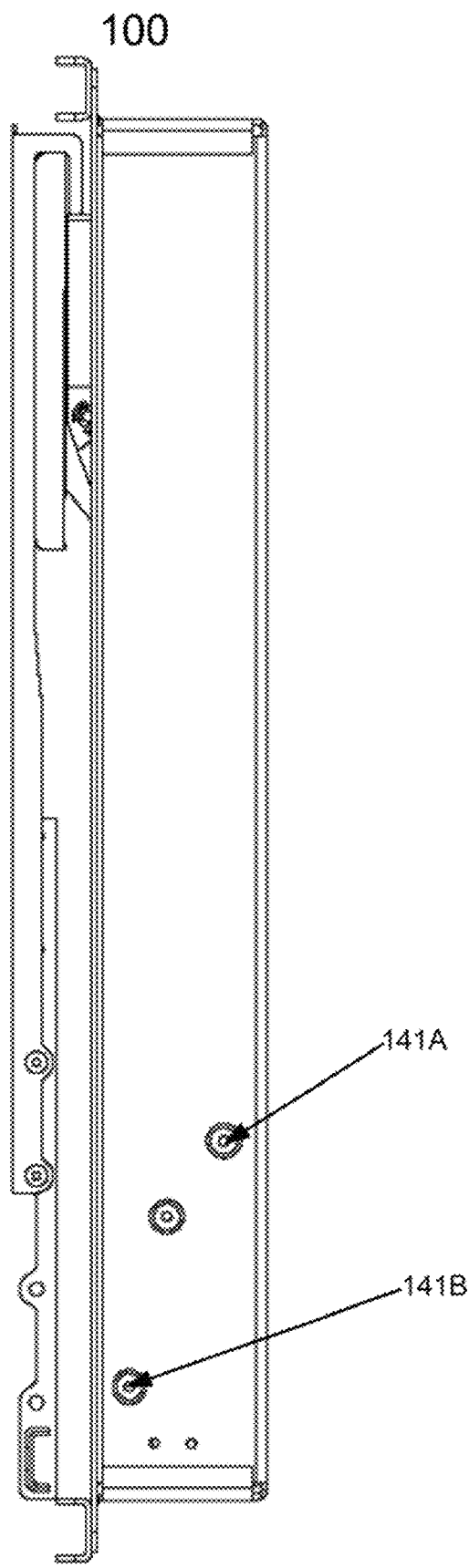
FIG. 7 is a right-side plan view of the wall mount assembly of FIG. 1 without the TV, in a retracted configuration.

FIG. 1 is a lower left-side perspective view illustrating selected components of a wall mount assembly 100 with a TV 110 mounted on it. FIG. 2 is a front right-side perspective view of the wall mount assembly 100, without the TV 110 and without certain component(s) shown in FIG. 1. FIG. 3 is a partial, rear upper right-side perspective view of a portion of the wall mount assembly 100, with an inset magnifying the elements within the circle AA. FIG. 4 is a perspective view of a multi-axes hub 400 of the mount assembly 100. FIG. 5 is another perspective view of the wall mount assembly 100, in a mostly-extended/lowered configuration and without the TV 110. Numeral 510 shown in FIG. 5 designates optional locations for temperature sensors, which will be discussed further below. FIG. 6 is a right-side plan view of the wall mount assembly 100, in the mostly-extended/lowered configuration and without the TV 110. FIG. 7 is a right-side plan view of the wall mount assembly 100, in a completely retracted configuration and without the TV 110.

The wall mount assembly 100 includes a box-like wall mounting portion 120, which is attached to (inserted into) a wall above a fireplace 115; a display mounting portion with the TV 110 mounted on its front in FIGS. 1 and 3; and an extending/contracting portion 140 between the wall mounting portion 120 and the display mounting portion 130. In FIG. 1, the extending/contracting portion 140 is shown in a partially extended configuration, with the TV 110 away from the wall. The extending/contracting portion 140 may lower the TV 110 further; the extending/contracting portion 140 may also raise the TV 110 above the fireplace, to be close to the wall (flat or substantially flat with the wall, possibly slightly angling forward). In the retracted configuration, the extending/contracting portion 140 may be retracted substantially inside the wall mounting portion 120. As shown in FIG. 1, the TV 110 is swiveled somewhat to the right.

The extending/retracting portion 140 includes upper arms 142A and 142B; lower arm 144A and 144B; a wall mounting bracket 156 with vertical supports 156A/156B/156C and a lower horizontal member (obscured in the Figures) connecting the vertical supports 156A/156B/156C; top covers 142C (rear) and 142D (front); bottom cover 144C; linear actuators 146 and 148; a vertical rod 158; upper front axle 161A and its tube cover 165A; lower front axle 161B and its tube cover 165B; vertical front members 154A/154B; and a horizontally swiveling portion 159 that includes an upper display mounting bar 159A, a vertical tube member 159B surrounding and rotating about the vertical rod 158, a lower display mounting bar 159C, a joint attachment bar 159D (FIGS. 3 and 4), an actuator attachment joint 163B on the right side of the joint attachment bar 159D and an analogous actuator attachment joint on the left side of the joint attachment bar 159D (which is obscured in the Figures, and which may be referred to as joint 163A).

The upper arms 142A/142B and the lower arms 144A/144B are attached to the wall mounting bracket 156 with rear axles 141A (upper) and 141B (lower, FIGS. 6 and 7), respectively, and can rotate relative to the wall mounting bracket 156 about their respective axles, within limited ranges. The rotation ranges are sufficient to lower the TV 110 into various positions and raise the TV 110 to the wall, next to the wall mounting portion 120, with the extending/contracting portion 140 completely retracted into the wall mounting portion 120. The lower end of the ranges may be adjustable, for examples, by "soft" stops as will be described further below, or by means similar to those shown and described in U.S. Provisional Patent Application Ser. No. 62/655,805, filed on or about 10 Apr. 2018, and commonly owned with the present application. The rear axles 141A/141B may be, for example, rods or bolts capped with nuts on their ends. The axle 141A may go through the wall mounting portion 120 from one side to the other side and provide support/attachment to the upper arms 142A and 142B; there may also be two rear upper axles, one on the left side supporting the upper arm 142A, and one on the right supporting the upper arm 142B. Similarly, the rear lower axle 141B may go through the wall mounting portion 120 from one side to the other side and provide support/attachment to the lower arms 144A and 144B; there may also be two rear lower axles, one on the left side supporting the lower arm 144A, and one on the right supporting the lower arm 144B. As shown in the Figures, the axle 141B is located not just lower than the axle 141A, but also forward (further from the wall, nearer the TV 110) of the location of the axle 141A.

The wall mounting bracket 156 may be attached to the wall mounting portion 120 with various means, for example, screws, nuts, or welds. The wall mounting bracket 156 may also be formed integrally with the wall mounting portion 120.

The upper arms 142A/142B and the lower arms 144A/144B are also attached to the front vertical front members 154A/154B with axles (e.g., rods, bolts) 161A and 161B, and can rotate relative to the vertical front members 154A/154B as the extending/contracting portion 140 is extended and retracted. This arrangement and its variants may be analogous to the attachment of the arms 142A/142B and 144A/144B to the wall mounting bracket 156. The top covers 142C/142D and the bottom cover 144C add structural integrity to the extending/contracting portion 140, conceal portions of the mechanism from view, and reduce the amount of external matter such as dust/dirt from entering the extending/contracting portion 140. A cross member 142E also adds structural integrity to the extending/contracting portion 140.

The linear actuators 146/148 are attached on one end to the wall mounting bracket or to the wall mounting portion 120. For example, the linear actuators 146/148 may be attached to the wall mounting bracket 156 directly, or with another component such as an actuator mounting block, which block may be adjustable in the vertical dimension (with a calibration screw, for example) for varying the force provided by the linear actuators 146/148 and accommodating displays of varying weight. The linear actuators 146/148 may rotate about their rear points of attachment to the mounting bracket 156 or the wall mounting portion 120. The rear attachment points of the linear actuators 146/148 may also be forward (further from the wall) of the axle 141A. As shown in the Figures, the attachment points of the linear actuators 146/148 are substantially in the same vertical plane as the axle 141B, in variants, the linear actuators are attached to the axle 141B and rotate thereabout. This arrangement, however, is not a strict requirement for all embodiments. On the other end, proximate the display mounting portion 130, the linear actuator 148 is attached to the joint attachment bar 159D at the joint 163B: and the linear actuator 146 is attached to the joint attachment bar 159D at the joint 163A (obscured in the Figures) at the left end of the joint attachment bar 159D. The linear actuators 146/148 may be substantially the same, for example, the same size, particularly in diameter, length, and performance (force that it can apply and/or weight it can lift); the linear actuators 146/148 may be of the same make/model; one of the linear actuators 146/148 may be a counterpart of the other linear actuator 148/146, but designed for opposite side installation (left-versus-right or right-versus-left).

The horizontally swiveling portion 159 can swivel right-left about the vertical rod 158. The display mounting portion 130 is attached to the horizontally swiveling portion 159, as can be seen in FIG. 3 and its inset, so that the display mounting portion 130 can swivel right-left with the horizontally swiveling portion 159. The TV 110 is attached to the display mounting portion 130 and swivels right-left with it.

In the fully-retracted position, the weight of the TV 110 (or another display in its place) is supported by the linear actuators 146/148. Because the direction of the force exerted by the weight of the TV 110 is downward and the linear actuators 146/148 are in a vertical or near-vertical position (as can be understood from, e.g., FIG. 7), the torque due to the weight is small and is easily counteracted by the motor-gearbox combinations of the linear actuators 146/148 even when no electrical energy drives the linear actuators 146/148. The wall mount assembly 100 may thus remain in this retracted position without application of additional forces. To extend/lower the TV 110, the linear actuators 146/148 are activated to cause them to shorten and thereby pull the TV 110 down and away from the wall, as the upper arms 142A/142B and the lower arms 144A/144B rotate about their respective axles 141A and 141B; from the extended position, application of opposite electrical drive to lengthen the actuators 146/148 pushes the TV 110 up and nearer the wall. The geometry of the wall mount assembly 100 is therefore such that the shortening of the linear actuators 146/148 causes the TV 110 to extend from the wall and be lowered; and vice versa, the lengthening of the linear actuators 146/148 raises the TV 110 and moves it nearer the wall.

The discussion in the previous paragraph assumes that the two linear actuators 146/148 work together, in parallel, i.e., extending and retracting by the same distance, i.e., exactly the same distance or substantially the same distance (within the limit of accuracy of the linear actuators). Such operation may be referred to as "parallel operation." But consider starting at some vertical position, such as the positions shown in FIGS. 1/5/6, with both linear actuators at the extension same length, and then driving a first linear actuator to shorten while at the same time driving the second linear actuator to lengthen. As a first approximation, if the incremental extension of the second linear actuator is approximately the same as the incremental retraction of the first linear actuator, the vertical position of the wall mount assembly 100 and the TV 110 will remain the same. But the horizontally swiveling portion 159 will rotate around the vertical rod 158. If the linear actuator 146 is extended and the linear actuator 148 is retracted, the horizontally swiveling portion 159, the display mounting portion 130, and the TV 110, will turn right. And vice versa, if the linear actuator is retracted and the linear actuator 148 is extended, the horizontally swiveling portion 159, the display mounting portion 130, and the TV 110, will turn left. When the linear actuators are operated so that the horizontally swiveling portion 159, the display mounting portion 130, and the TV 110 swivel without change in the vertical position (at least without a substantial change in the vertical position such that it would not be noticeable by the viewer of the TV 110 in normal viewing circumstances), the operation of the linear actuators may be referred to as "differential operation."

In the immediately preceding paragraph we say that the incremental extension is "approximately equal" to the incremental retraction, but the actual relationship between the incremental extension and incremental retraction to keep the vertical position constant is more complex. It can be calculated through a formula that incorporates various geometrical dimensions and angles of the wall mount assembly 100 and its vertical and swivel positions; alternatively, the relationships for various vertical positions can be derived experimentally. A person skilled in the art would recognize after careful perusal of this description and the attached drawings, that independent control of each of the linear actuators 146 and 148 enables independent control of the vertical position and the azimuth. In other words, the linear actuators 146/148 may be driven by the electronic circuitry of the wall mount assembly so that the TV 110 is (1) raised/lowered without changing the azimuth, (2) is swiveled without changing its vertical position, and (3) is raised/lowered and swiveled simultaneously in a prescribed line on the graph plotting the vertical position versus azimuth.

The linear actuators 146/148 together are powerful enough to operate the wall mount 100 with a range of the weights of displays for which the wall mount 100 is rated, plus some reserve weight capacity. As a person skilled in the pertinent art would understand after careful perusal of this description and the attached drawings, it may be easier and less expensive to provide two smaller linear actuators instead of a single one with twice the lifting capacity of the smaller ones. Additionally, the radius of the smaller linear actuators may be considerably smaller the radius of the larger single linear actuator; thus, the depth of the wall mounting portion 120 may be decreased, facilitating installation in thin walls.

The electronic circuitry of the wall mount assembly 100 may include a processor and supporting circuitry, including memory storing machine-executable commands (software/firmware). When the instructions are executed by the processor, the processor, among other functions, translates commands of the user into appropriate drive for each of the linear actuators 146/148. The linear actuators 146/148 may include sensors, such as hall effect sensors, to enable the processor to read the position (extension length) of each of the linear actuators, and vary the drive of each of the linear actuators 146/148 to cause the linear actuator to extend and/or retract to the desired computed length, using feedback control. The user's commands may be transmitted from a remote control device, for example, and received by a remote control receiver of the wall mount assembly 100.

Thus, in embodiments, the wall mount assembly 100 may include a handheld remote control unit and a receiver of the remote control unit. Through the remote control unit the user is enabled to issue remote commands that, possibly among other functions, extend/lower the display (e.g., the TV 110) to the viewing position, retract/raise the display to the storage position near the wall above the fireplace, place the display into some intermediate vertical position, and cause the display to swivel right-left. The remote control may operate, for example, over an infrared link. The remote control may also operate through a port (serial/USB or otherwise) that may connect to an interface box through which the wall mount assembly 100 connects to a smart home or business system, and/or to the Internet; if the wall mount assembly 110 connects to the smart home/business system, the commands may come via the Internet, for example, from an app running on a user's smart phone/computer/tablet, or from a remote controller of the smart home/business system.

Figure 8:
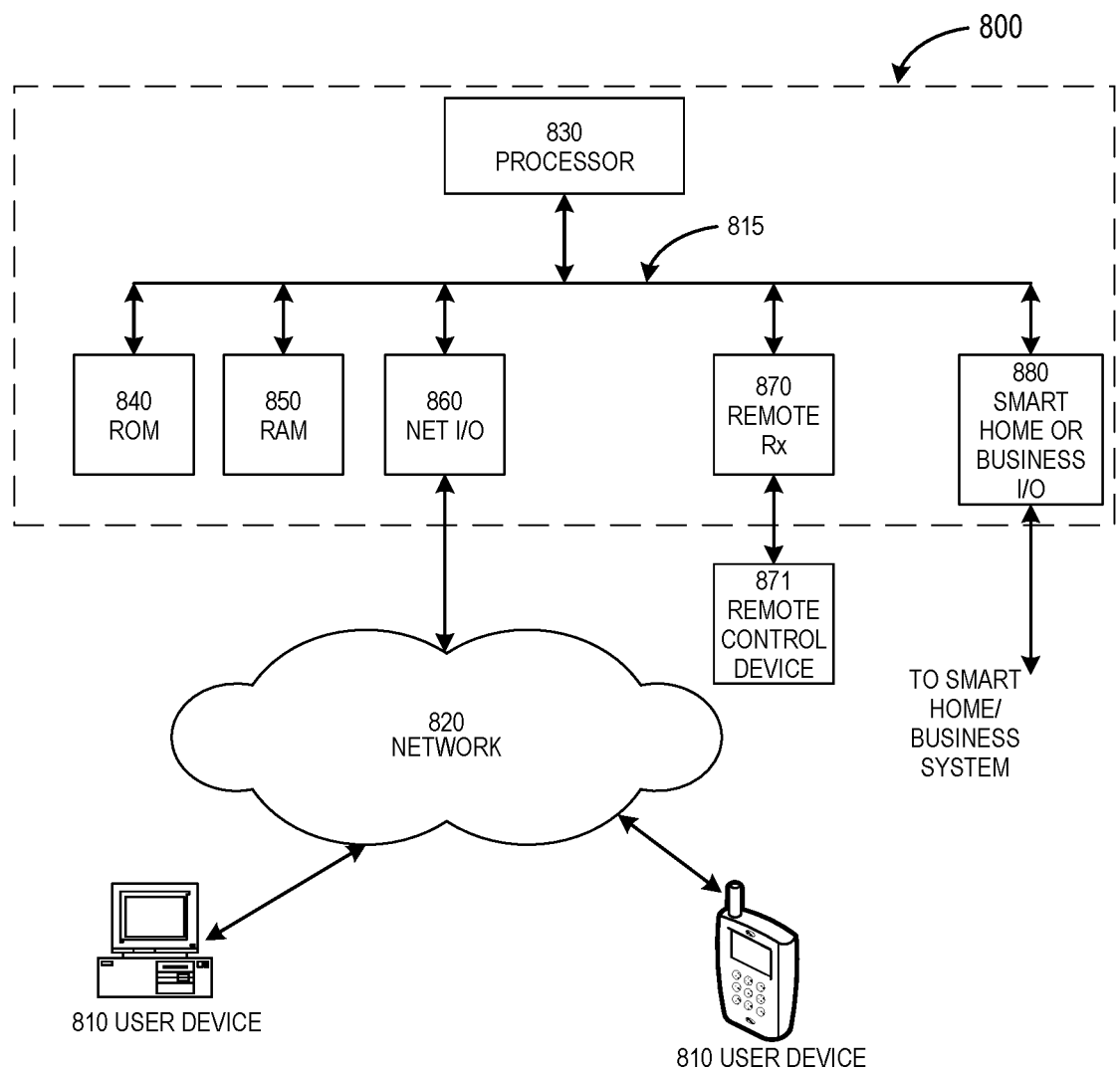
FIG. 8 illustrates selected components of an electronic subsystem of a wall mount system such as the wall mount assembly of FIG. 1, configured in accordance with selected features described in this document.

FIG. 8 illustrates selected components of an electronic subsystem 800 of a wall mount system such as the wall mount assembly 100, configured in accordance with selected features described in this document. The system 800 is coupled through a communication network 820 to user devices 810, such as personal computers, smartphones, and tablets. FIG. 8 does not show various hardware/software components and various physical and logical interconnections of some variants. The system 800 can be implemented, for example, as a special purpose data processor, a general-purpose computer, a computer system, configured to perform the steps and functions described in this document.

The electronic subsystem 800 includes a processor 830 such as a microprocessor or a microcontroller, read only memory (ROM) module 840, random access memory (RAM) module 850, a network interface 860 coupled to the communication network 820, a remote control receiver 870 (e.g., wireless remote control receiver) for receiving commands and/or data from the remote control device 871 (e.g., handheld remote controller), and a smart home/business interface (I/O) 880. These components are coupled together by a bus 815, so that the processor 830 can write data into and read data from these devices. The network interface 860 couples the processor 830 to the communications network 820, which network may include the Internet. The nature of the network 820 and of the devices that may be interposed between the subsystem 800 and the network 820 determine the nature of the network interface 860. For example, the network interface 860 may be an Ethernet interface that connects the subsystem 800 to a local area network and through it to the Internet. Similarly, the smart home/business interface 880 couples the processor 830 to the smart home/business system, and the nature of the smart home/business system and of the devices that may be interposed between the subsystem 800 and the smart home/business system determine the interface 880. For example, the interface 880 may be an Ethernet interface, a Wi-Fi transceiver and associated circuitry, or a USB port.

The processor 830 is configured to read and execute program code instructions stored in the ROM module 840. Under control of the program code, the processor 830 configures the subsystem 800 to perform all or some of the commands/functions, as has already been mentioned. The program code instructions may also be embodied in machine-readable storage media, such as hard drives, CD-ROMs. DVDs, flash memories, and similar devices that can store the instructions permanently or temporarily, in a non-transitory manner. The program code may also be transmitted over a transmission medium, for example, over electrical wiring or cabling, through optical fiber, wirelessly, or by any other form of physical transmission. The transmission can take place over a dedicated link between telecommunication devices, or through wide- and local-area networks, such as the Internet, an intranet, extranet, or any other kind of public or private network. In embodiments, the program code is downloaded to the subsystem 800 through the network interface 860 and/or the smart home/business interface 880.

Figure 9:
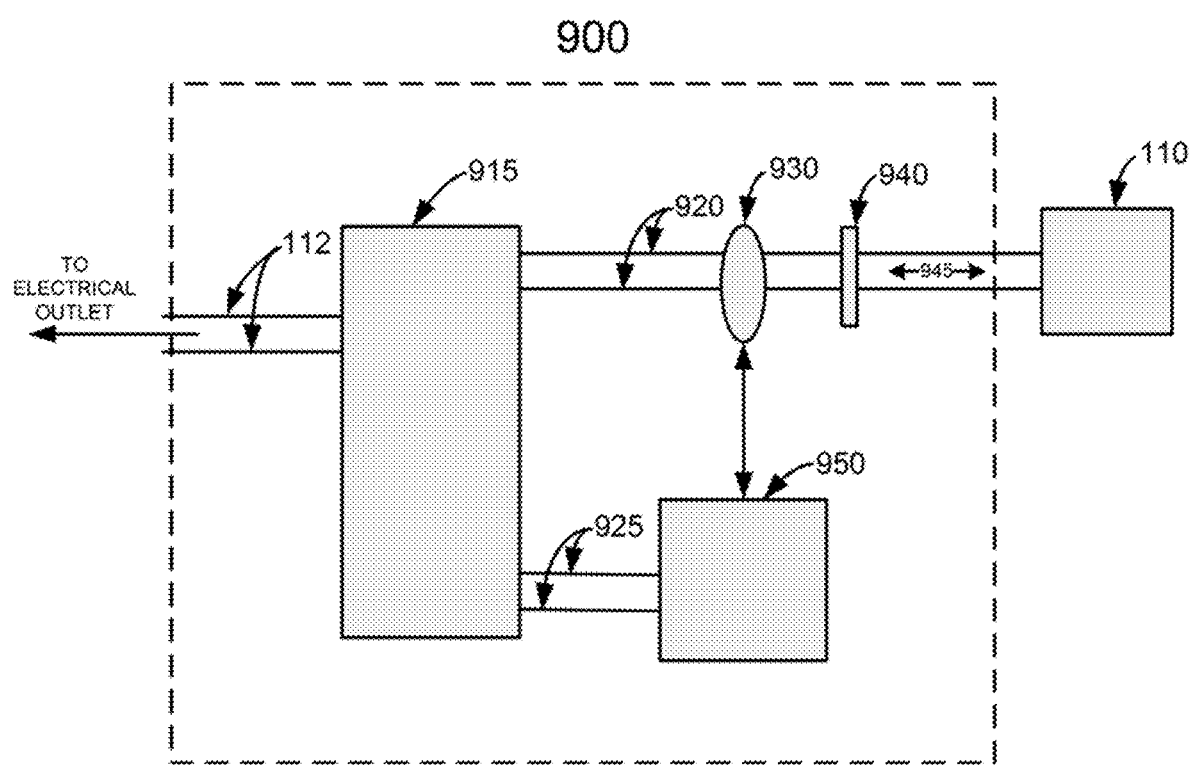
FIG. 9 illustrates selected components of an electrical subsystem of a wall mount system such as the wall mount assembly of FIG. 1, configured in accordance with selected features described in this document.

FIG. 9 illustrates selected components of an electrical subsystem 900 of a wall mount system such as the wall mount system 100, configured in accordance with selected features described in this document. Note that the electrical subsystem 900 may share components with the electronic subsystem 800, particularly the processor and instructions-storing memory. The electrical subsystem 900 includes an electrical cord/plug 112, which is also shown in FIG. 1 (plugged into a wall outlet above the fireplace 115); a parallel power splitter 915, which provides electrical power to the TV 110 through a display line 920 and electrical socket 940; and to electrical/electronic circuitry 950 of the wall mount assembly 100, through an internal power supply line 925. The power splitter 915 may be or include simple one-into-two (or more) AC lines, such as in power strips and power bars.

Thus, one output of the power splitter 915 provides power to a display socket 940 through a display power line 920. The TV 110 (or another display) may be plugged into the display socket 940 and receive from the socket 940 power for its operation. A second output of the power splitter 915 provides power for operation of the electrical/electronic circuitry 950, through the internal power supply line 925. In embodiments, the power splitter 915 may include power supplies for providing lower voltages (lower than the voltage at the electrical outlet) for operation of the electrical/electronic circuitry 950 and the linear actuators 146/148; the power supply circuitry may include rectification capability and provide the lower voltages as DC rather than AC.

Note a current monitoring sensor 930, which may be a magnetically coupled clamp sensor surrounding the display power line 920 and may be capable of being read by the processor of the wall mount assembly 100, such as the processor 830, under control of the machine-readable instructions executed by the processor 830. In this way, the processor 830 can measure current 945 consumed by the TV 110 plugged into the electrical socket 940. In embodiments, the processor 830 reads the current 945 at intervals between 1 millisecond and 500 millisecond; in embodiments, the processor 830 reads the current 945 between 10 milliseconds and 100 milliseconds. In embodiments, the current monitoring sensor 930 includes one or more comparator circuits and provides interrupts to the processor 830 when the current 945 exceeds a threshold (or one of the thresholds), and/or when the current 945 drops below a threshold (or one of the thresholds). The threshold(s) may be programmable. The signal(s) from the current monitoring sensor 930 input into the comparator(s) may be filtered, for example, with low pass filter(s); the low pass filters may have time constants, for example, between 10 microseconds and 10 milliseconds.

In operation, the processor 830 executing the instructions may determine when the TV 110 is turned on and/or off, and take predetermined action(s) in response to the TV 110 being turned on and/or off. For example, when the processor 830 determines that the TV 110 has been turned on (such as by the user operating a remote controller of the TV 110, which may be different from the remote control device of the wall mount assembly 100 and not connected to the wall mount assembly 100), the processor 830 may cause the wall mount assembly 100 to lower the TV 110 into a predetermined/preprogrammed position. Similarly, when the processor 830 determines that the TV 110 has been turned off (such as by the user operating the remote controller of the TV 110), the processor 830 may cause the wall mount assembly 100 to retract the TV 110 towards the wall above the fireplace 115.

In embodiments, the processor 830 executing the instructions determines that the TV 110 has just been turned off in response to sensing the current 945 falling below an OFF threshold, and determines that the TV 110 has been just turned ON when the current 945 when the current 945 exceeds an ON threshold. The ON and OFF thresholds may be same or different; the signals from the current monitoring sensor 930 into a comparator (or comparators, as the case may be) may be conditioned, for example, using low pass filters; and the threshold(s) may be programmable. As a person skilled in the art would understand after careful perusal of this description and the attached drawings, the comparators may be implemented, for example, using actual voltage comparator circuits, implemented using analog-todigital converters (ADC's) with appropriate code executed by the processor 830, implemented using analog or digital application specific circuits, or otherwise implemented.

Using simple predetermined thresholds for determining when the TV is turned ON and/or OFF, however, may be problematic for at least two reasons. First, the wall mount assembly 100 may need to accommodate different TVs, with a range of power/current needs. Second, a modern TV often or always monitors something. The "something" may be a network connection, a remote control device, a smart phone connected through a network server; some TVs monitor ambient audio. Additionally, many smart TVs periodically check for software updates and download the updates when needed. Thus, although the user may perceive the TV to be off, the TV may be in the "idle state" in which it consumes some non-trivial power, and the idle state power can vary substantially from time to time and from one TV to another. Therefore, a modern TV may consume some power always or often enough to make reliance on simple thresholds problematic.

In embodiments, the processor 830 executing the instructions monitors the current continually, for example, every 1-10 milliseconds. (Here as everywhere in this document, the current 945 reading may be lowpass-filtered, as has already been mentioned.) The processor 830 executing the instructions may store the current 945 measurements for a predetermined period of time $T_{bck}$, such as between 1 and 10 seconds in some examples and between 3 and 6 seconds in more specific examples, and discard earlier reading(s). The processor 830 detects a current spike that results from turning on the backlight of the TV 110. This is typically a distinct event, a high current spike with duration of the order of a few tens or several hundred milliseconds. The spike over a predetermined spike threshold $TH_{spike}$ may last between 10 milliseconds and 500 milliseconds in some examples, and between 40 milliseconds and 250 milliseconds in more specific examples; the spike threshold $TH_{spike}$ may be set at a relatively high level, such as above one ampere (for 110 VAC power); the processor 830 identifies the current spike accordingly, when it senses through the current monitoring sensor 930 a current exceeding the predetermined threshold $TH_{spike}$. Once the processor 830 executing the instructions identifies such a current 945 spike event, it recalls from storage the recorded readings from some time $T_{off}$ earlier, before the beginning of the spike was identified but within $T_{bck}$, and sets the current ON and/or OFF thresholds based on the current readings at these earlier times when the TV was in the off/idle state.

The time $T_{off}$ may be determined, for example, by subtracting a predetermined "look back" time duration $T_{lookback}$ from the time when the spike was initially detected. The processor 830 executing the instructions may set the current ON threshold $T_{hON}$ to the value of the recorded reading of the current 945 at the time $T_{off}$ plus some predetermined margin current amount (e.g., >100 mA) or a predetermined percentage (e.g., >20 percent or between 20 and 50 percent) of the earlier $T_{off}$ reading(s) or averaged readings earlier than $T_{off}$. The time period $T_{lookback}$ may be, for example, greater than 100 milliseconds; in more specific examples, $T_{lookback}$ is between 500 milliseconds and 1500 milliseconds. In this way, the current threshold $T_{hON}$ may be determined, and dynamically adjusted if the processor 830 executing the instructions repeats the threshold determination on each spike event, or on some spike events. The current threshold $T_{hON}$ may be adjusted through an averaging process on each or some spike events. Thus, if the TV 110 is replaced with a different model that draws more or less current, the processor 830 executing the instructions may "learn" and store a more appropriate $T_{hON}$.

The processor 830 executing the instructions may set the current OFF threshold $T_{hOFF}$ analogously, for example, to the value of the recorded reading of the current 945 at the time $T_{off}$ plus some predetermined margin current amount (e.g., >50 mA) or a predetermined percentage (e.g., >10 percent or between 10 and 30 percent) of the earlier $T_{off}$ reading(s) or averaged readings earlier than $T_{off}$.

Note that the processor 830 may ignore spike events with duration of less than some predetermined duration. As has already been mentioned, the duration may be between 10 milliseconds and 500 milliseconds in some examples; and between 40 milliseconds and 250 milliseconds in more specific examples.

Figure 10:
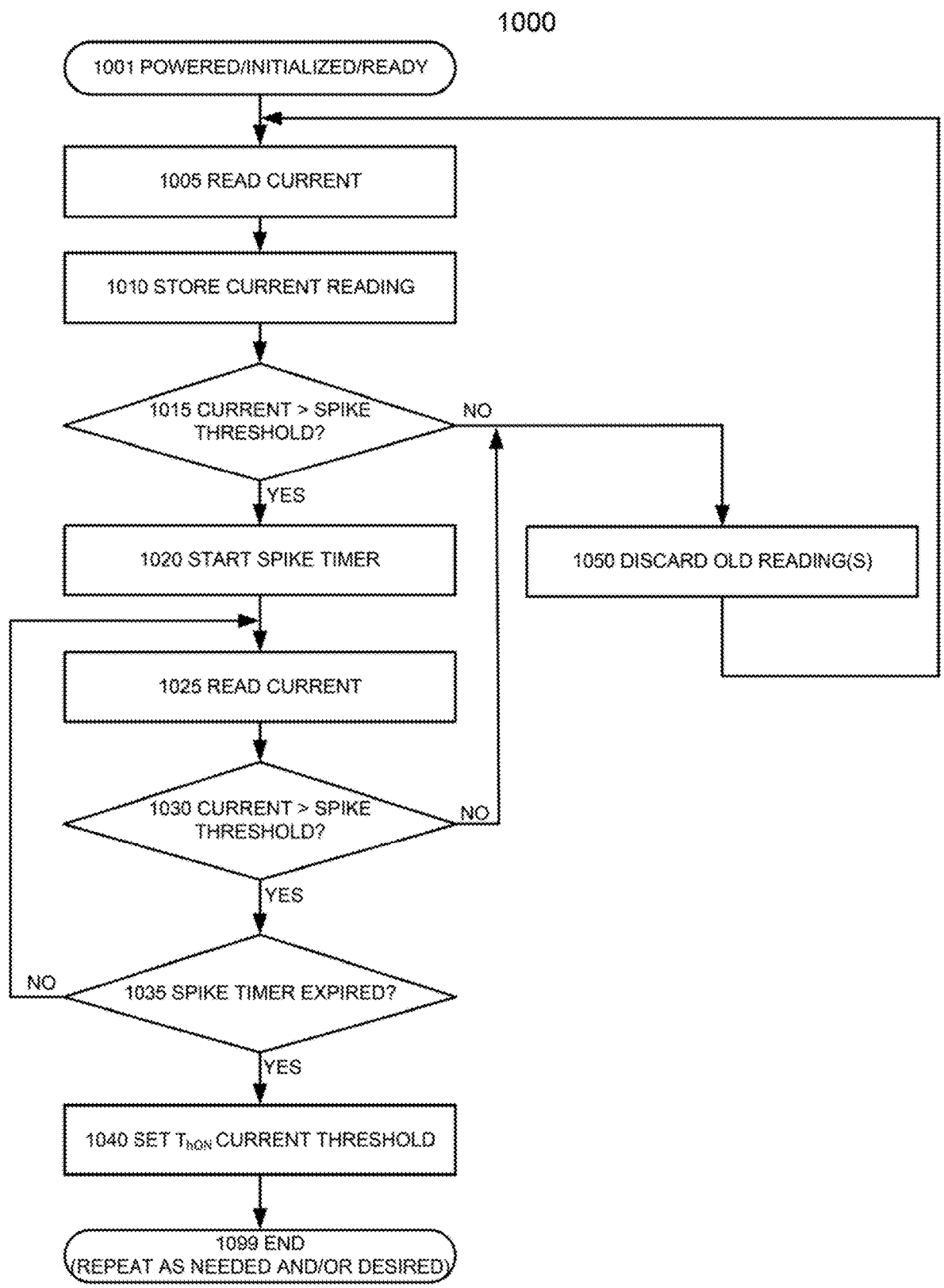

FIG. 10 is a process flow diagram illustrating selected steps and decision blocks of a process 1000 for setting the current threshold $T_{hON}$. Although the process steps and decisions are described serially, certain steps and decisions may be performed by separate elements in conjunction or in parallel, asynchronously or synchronously, in a pipelined manner, or otherwise. There is no particular requirement that the steps and decisions be performed in the same order in which this description lists them, except where a specific order is inherently required, explicitly indicated, or is otherwise made clear to a person skilled in the art from the context. Furthermore, not every illustrated step and decision block may be required in every embodiment in accordance with the invention, while some steps and decision blocks that have not been specifically illustrated, may be desirable or necessary in some embodiments in accordance with the invention.

At flow point 1001, the wall mount assembly 100 is powered up, initialized, and ready to perform the process 1000.

In step 1005, the current consumed by the TV is read, for example, by the processor 830 through the current monitoring sensor 930.

In step 1010, the current reading from the previous step is stored, for example, in the RAM module 850 or in another memory/storage accessible by the processor 830.

In decision block 1015, it is determined whether the current reading from the step exceeds the predetermined and relatively high spike threshold $TH_{spike}$.

If the current reading from the step 1005 does not exceed the spike threshold, process flow may continue from the decision block 1015 to step 1050, to discard old current reading(s) from $T_{bck}$ back. Alternatively, old current readings may be discarded periodically or at predetermined times or when memory needs to be freed for other operations, or otherwise.

If the current reading from the step 1005 exceeds the spike threshold, the process flow may continue from the decision block 1015 to step 1020, to start a spike timer.

In step 1025, the current consumed by the TV is read, for example, by the processor 830 through the current monitoring sensor 930. This is analogous to the step 1005.

In decision block 1030, it is determined whether the current reading from the step 1025 exceeds a predetermined and relatively high spike threshold. As a person skilled in the pertinent art would understand after careful perusal of this description and the attached drawings, the spike threshold in the decision block 1030 may be the same or substantially the same as the spike threshold $TH_{spike}$ of the decision block 1015. It may also differ, but still be relatively high; in examples, the spike threshold of the decision block 1030 is set 5-25 percent below the spike threshold $TH_{spike}$ of the decision block 1015, to provide some hysteresis and not exit the timer loop (steps/decisions 1020-1035) prematurely.

If the current reading from the step 1025 does not exceed the threshold, the process flow continues from the decision block 1030 to the step 1050, and then back to the step 1005.

Otherwise, the process flow continues from the decision block 1030 to decision block 1035, where the spike timer is checked. If the spike timer has not expired, the process flow returns from the decision block 1035 to the step 1025.

If the spike timer has expired, the process flow continues from the decision block 1035 to step 1040, to set the current ON threshold $T_{hON}$. As has already been discussed, the recorded current readings from the time $T_{off}$ may be recalled from memory. The time $T_{off}$ may be determined, for example, by subtracting the predetermined look back time duration $T_{lookback}$ from the time when the spike was initially detected in the decision block 1015. The current ON threshold $T_{hON}$ may be set to the value of the recorded reading of the current 945 at the time $T_{off}$ adjusted by a predetermined margin current amount or margin percentage, and multiple current readings near and/or earlier than $T_{off}$ may be averaged or otherwise combined. The time period $T_{lookback}$ may be, for example, greater than 100 milliseconds; in more specific examples, $T_{lookback}$ is between 500 milliseconds and 1500 milliseconds.

The current threshold $T_{hON}$ may be adjusted through an averaging process across different spike events, in addition to or instead of averaging the current readings near $T_{off}$ associated with a single spike event. For example, if a first spike event results in a computation of $T_{hON}=V1$, (without averaging over multiple spike events), and a second spike event results in a computation of $T_{hON}=V2$ (also without averaging over multiple spike events), the second $T_{hON}$ may then be averaged with the first $T_{hON}$, and the second adjusted $T_{hON}$ may be set to $(V1+V2)/2$. In examples, a weighted moving average technique may be used, with more than two values. These are, of course, just examples.

The process 1000 may then terminate at flow point 1099, to be repeated as needed and/or desired.

The OFF threshold $T_{hOFF}$ may be set in a process similar to the process 1000, using a different computation (margins) in the step 1040. In examples, however, $T_{hON}$ and $T_{hOFF}$ are the same, at least before averaging over multiple spike events.

Turning now back to FIG. 5, a temperature sensor, such as a thermistor or a thermocouple, may be installed in the locations 510. As a person skilled in the pertinent art would understand after careful perusal of this description and the attached drawings, the temperature sensor may be installed in other locations, and there may be several temperature sensors built into or added to various locations of the wall mount assembly 100. But there is generally an advantage to install the temperature sensor on or near the display mounting portion 130, so that there is a close relationship between the temperature reading of the temperature sensor and the ambient temperature to which the TV 110 or another display is subjected. Particularly in installations near a fireplace, there may be an advantage in installing the sensor towards the bottom of the display mounting portion 130, so that the temperature sensor is in a location that may be exposed to the increased temperature near the fireplace.

In operation, the temperature sensor is (or sensors are, as the case may be) read by the processor 830 executing the instructions. Here, as in the case of the signal provided by the current monitoring sensor 930, the signal from the temperature sensor may be processed with a low pass filter, whether software or hardware, to eliminate spurious signals; the time constant for the filter may be, for example, between 3 and 40 seconds. When the temperature reading exceeds some predetermined threshold, for example, set between 50 and 60 degrees Celsius, the processor 830 takes predetermined action(s). If the wall mount assembly 100 is in the extended position, for example, the processor 830 executing the instructions may activate the linear actuators 146/148 to straighten and retract the TV 110. Further, the processor 830 executing the instructions may communicate with one of the user devices 810 through the network interface 860 and the communication network 820, informing the user or another person/entity of the dangerous temperature rise. Similarly, the processor 830 may communicate with the smart home/business system through the smart home/business interface 880, informing the smart home/business system of the temperature rise, and possibly causing a fire or other alarm and/or warning. An advantage of this configuration is that the temperature sensor of the wall mount assembly 100 is near the fireplace and may provide an earlier alarm than a smoke detector installed farther from a potential ignition source.

As has already been mentioned, when the processor 830 determines that the TV 110 has been turned on, the processor 830 may cause the wall mount assembly 100 to lower the TV 110 into predetermined or position. The predetermined position may be pre-programmed by the user or the installer, for example. The user may also issue a command to the wall mount assembly 100, to cause the wall mount assembly 100 to place the TV 110 into a selected pre-programmed position, for example, through the remote control device of the wall mount assembly 100. The remote control device may enable the user to program the positions, and to select the particular position. For example, the remote control device may include buttons for the user to vary the elevation and azimuth of the wall mount assembly 100, thereby enabling the user to place the TV 110 into a desirable watching position. The remote control device may also have buttons for memorizing the selected positions, and then recalling them in the future, to place the TV 110 into a selected watching position as the user desires.

Figure 11:
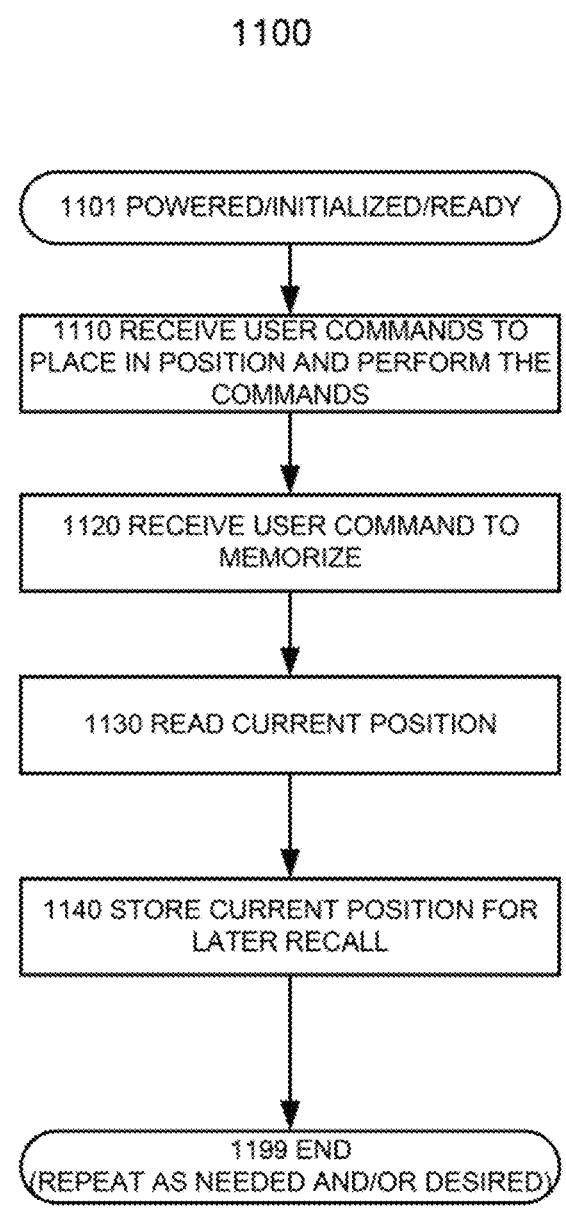
FIG. 11 is a process flow diagram illustrating selected steps of a process for enabling the user or the installer to program viewing positions of a wall mount assembly such as the wall mount assembly of FIG. 1.

FIG. 11 is a process flow diagram illustrating selected steps and decision blocks of a process 1100 for enabling the user or installer to program a viewing position. Although the process steps and decisions (if present) are described serially, certain steps and decisions may be performed by separate elements in conjunction or in parallel, asynchronously or synchronously, in a pipelined manner, or otherwise. There is no particular requirement that the steps and decisions be performed in the same order in which this description lists them, except where a specific order is inherently required, explicitly indicated, or is otherwise made clear from the context. Furthermore, not every illustrated step and decision block may be required in every embodiment in accordance with the invention, while some steps and decision blocks that have not been specifically illustrated, may be desirable or necessary in some embodiments in accordance with the invention.

At flow point 1101, the wall mount assembly 100 is powered up, initialized, and ready to perform the process 1100.

In step 1110, the processor 830 receives command(s) from the user/installer to change elevation and/or azimuth of the TV 110, and moves the TV 110 accordingly. The commands may be received through the remote control receiver 870. The processor 830 performs the command(s), by controlling the drive of the linear actuators 146/148 responsive to the received commands, changing the elevation and/or azimuth accordingly.

In step 1120, the processor 830 receives a command to memorize the current position (elevation, azimuth). For example, this command may also be received through the remote control receiver 870. The command may include a specific designation of the position, that is, correspondence of the position to a particular button of the remote control device for future recall (e.g., a button on the remote control device marked as "Position 1").

In response to the command received to memorize, in step 1130, the processor reads the position sensors of the linear actuators (such as the hall effect sensors of the linear actuators).

In step 1140, the processor 830 stores the readings of the sensors (position readings) in memory, such as in the RAM module 850 or in another memory/storage accessible by the processor 830, whether locally (in the electronic subsystem 800) and/or remotely (through the network interface 860 or the smart home/business interface 880). The local memory where the position is stored may be persistent, such as battery backed memory, flash memory, magnetic memory. The memory where the processor 830 may also or instead The processor 830 is configured to receive user command (e.g., from the remote control device, through the remote control receiver 870) to configure/place the wall mount assembly 100 in the memorized position, by controlling the drive into the linear actuators 146/148.

The process 1100 may then terminate at flow point 1199, to be repeated as needed and/or desired, for example, to memorize one or more additional viewing positions. The position (elevation, azimuth) is now ready for recall, for example, in response to a user command to position the TV 110 in the memorized position, which command may also be received from the remote control device through the remote control receiver 870. For example, the processor 830 may configure the wall mount assembly 100 in the memorized position in response to receiving through the remote control receiver 870 a user/installer command corresponding to pressing of the same button that was used to memorize the position ("Position 1" button, if it was used to memorize the position).

The wall mount assembly 100 may similarly be programmed to recognize programmable or "soft" stops, beyond which the wall mount assembly 100 will not move the TV 110 in either the azimuth or vertical direction. The process may be analogous to the process 1100, with the step 1140A "STORE CURRENT POSITION AS SOFT STOP" replacing the step 1140 shown in FIG. 11. Additionally or instead, the wall mount assembly 100 may learn the soft stops automatically. To do this, the wall mount assembly 100 may be equipped with sensors that measure when either of the linear actuators 146/148 fails to move the TV 110 despite being driven by the processor 830. For example, the wall mount assembly 100 may be equipped with sensors that sense the current used by the linear actuators. When the current increases beyond a predetermined threshold, the processor 830 determines that there is an obstruction in the direction in which the linear actuator attempts to move the TV 110; the predetermined current threshold (for the purpose of detecting an obstruction) may be obtained from a graph of current versus position for each of the linear actuators 146/148, or may be set to some value regardless of the position of the linear actuator. The graph may be selected for the wall mount assembly 100 by the user/installer by programming the make/model number or other parameters of the TV 110. The wall mount assembly 100 may store the graphs for various TVs/displays, e.g., in the ROM module 840, the RAM module 850, or another memory accessible by the processor 830 directly or through the network 820.

As another example, the processor 830 may monitor the feedback from the position sensors in the linear actuators (such as the hall effect sensors) and determine that an obstructions has been encountered in the direction in which the actuator attempts to move the TV 110 when the movement stops or is slowed down substantially (e.g., more than 50 percent) from what is expected given the drive provided to the actuator(s) and the position(s) of the actuator(s). When the processor 830 determines that an obstruction has been encountered, the processor 830 stores the position (azimuth and/or elevation) in the memory as an obstruction, including the direction in which the movement of the display mounting portion 130 with the TV 110 mounted on it was obstructed. The processor 830 then avoids driving the linear actuators 146/148 in a way that would attempt to move the display mounting portion 130 with the TV 110 mounted on it past the obstruction in that direction. In embodiments, the processor 830 leaves a small spatial margin, say ⅛ to ½ inch between the display mounting portion 130 with the TV 110 mounted on it and the memorized obstruction.

In embodiments, the processor 830 memorizes/stores an obstruction point with its associated direction after multiple detections of an obstruction within some predetermined distance of each other. For example, the processor may memorize an obstruction and its associated direction if the obstruction has been detected three times within ½ inch of each other, and in generally the same direction.

Turning next to the remote control device used for remotely controlling the wall mount assembly 100, the device may transmit commands using infrared radiation, and the remote control receiver 870 then may be an infrared receiver. In embodiments, however, the remote control device transmits commands using radio frequency (RF), and the remote control receiver 870 is an RF receiver. This has a distinct advantage of allowing a greater range of locations for mounting the remote control receiver 870, without regard to line of sight operation and the obstruction by the movable components of the wall mount assembly 100, such as the extending/contracting portion 140 and the display mounting portion 130 with the TV 110 mounted on it.

The features of TV/display mount assemblies described throughout this document may be present individually or in any combination or permutation, except where the presence or absence of specific elements/limitations is inherently required, explicitly indicated, or otherwise made clear from the context. Not every illustrated element is necessarily required in every embodiment in accordance with the concepts described in this document, while some elements that have not been specifically illustrated may be desirable in some embodiments in accordance with the concepts.

This document describes in detail the inventive wall mount assemblies and their operations. This was done for illustration purposes and, therefore, the foregoing description and the Figures are not necessarily intended to limit the spirit and scope of the invention(s) described. The features of TV/display mount assemblies described throughout this document may be present individually or in any combination or permutation, except where the presence or absence of specific elements/limitations is inherently required, explicitly indicated, or otherwise made clear from the context. Not every illustrated element is necessarily required in every embodiment described in this document, while some elements that have not been specifically illustrated may be desirable in some embodiments. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A mounting device, comprising:
   a wall mounting portion configured to attach to a wall;
   a display mounting portion configured to receive a display;
   an extending/contracting portion between the wall mounting portion and the display mounting portion, the extending/contracting portion comprising a first actuator and a second actuator, the first actuator being parallel to the second actuator, wherein, when the wall mounting portion is mounted vertically, actuation of the first actuator and the second actuator allows independent control of azimuth of the display mounting portion and independent control of elevation of the display mounting portion in parallel operation and in differential operation;
   a wireless handheld remote controller; and
   an electronic subsystem coupled to the first and second actuators to control extension and contraction of the first and second actuators, the electronic subsystem includes a processor and a wireless remote control receiver coupled to the processor to allow the processor to read commands received by the wireless remote control receiver from the wireless handheld remote controller.

2. The mounting device as in claim 1, wherein the first actuator comprises a first linear actuator and the second actuator comprises a second linear actuator.

3. The mounting device as in claim 2, wherein:
   the first actuator comprises a first position sensor configured to indicate extension length of the first linear actuator; and
   the second actuator comprises a second position sensor configured to indicate extension length of the second linear actuator.

4. The mounting device as in claim 3, wherein the electronic subsystem is configured to read the first and second position sensors.

5. The mounting device as in claim 4, wherein the first and second position sensors are hall effect sensors.

6. The mounting device as in claim 4, wherein the electronic subsystem comprises one or more memories coupled to the processor, at least one of the one or more memories storing code executable by the processor.

7. The mounting device as in claim 6, wherein the code comprises instructions to receive commands to change elevation and azimuth of the display mounting portion, and to provide drive to the first and second linear actuators to execute the commands.

8. The mounting device as in claim 7, wherein the code further comprises instructions to memorize elevation and azimuth of the display mounting portion.

9. The mounting device as in claim 7, wherein the code further comprises instructions to obtain readings of the first and second position sensors and to memorize elevation and azimuth of the display mounting portion based on the readings of the first and second position sensors.

10. The mounting device as in claim 9, wherein the code further comprises instructions to receive commands to place the display mounting portion at the memorized elevation and azimuth, and to drive the first and second linear actuators so that the display mounting portion is placed in the memorized elevation and azimuth.

11. The mounting device as in claim 9, wherein the code further comprises instructions to receive commands to memorize a soft stop at the memorized elevation and azimuth, and to prevent driving the first and second linear actuators beyond the memorized elevation and azimuth.

12. The mounting device as in claim 9, further comprising means for automatically learning one or more soft stops.

13. A mounting device, comprising:
    a wall mounting portion configured to attach to a wall;
    a display mounting portion configured to receive a display;
    an extending/contracting portion between the wall mounting portion and the display mounting portion, the extending/contracting portion comprising a first actuator and a second actuator, the first actuator being parallel to the second actuator, wherein, when the wall mounting portion is mounted vertically, actuation of the first actuator and the second actuator allows independent control of azimuth of the display mounting portion and independent control of elevation of the display mounting portion in parallel operation and in differential operation; and
    a temperature sensor, wherein an electronic subsystem has one or more memories that store code instructions to obtain readings of the temperature sensor and to drive the first and second actuators to retract the display mounting portion in response to one or more of the readings exceeding a predetermined maximum temperature limit.

14. A method of operating a mounting device, the method comprising:
    monitoring the current consumed by a display device mounted on the mounting device, thereby obtaining values of the current consumed by the display device;
    recording in a memory device the values of the current consumed by the display device;
    setting a spike current threshold by determining when a spike of at least a predetermined spike duration and of at least predetermined spike level occurs in the current consumed by the display device, recalling from the memory device value of the current consumed by the display device at a time Toff=Tsb−Tlookback, wherein Tsb is the time the spike began and Tlookback is a predetermined lookback time duration, and setting the spike current threshold by incrementing the value of the current consumed by the display device at the time Toff by a predetermined margin;
    determining when the current consumed by the display device exceeds the spike current threshold; and configuring the mounting device to position the display device into a predetermined viewing position in response to the current consumed by the display device exceeding the spike current threshold.

15. The method of claim 14, wherein:
the predetermined margin is between 20 and 50 percent of the value of the current consumed by the display device at the time Toff;
the Tlookback predetermined lookback time duration is between 500 and 1500 milliseconds;
the predetermined spike level is about 1 ampere; and
the predetermined spike duration is between 10 and 500 milliseconds.

16. The method of claim 14, wherein:
the predetermined margin is greater than 100 mA;
the Tlookback predetermined lookback time duration is greater than 100 milliseconds;
the predetermined spike level is above 1 ampere; and
the predetermined spike duration is between 40 and 250 milliseconds.

17. The method of claim 14, wherein the spike current threshold is dynamically adjusted in response to multiple spike events, and the display device comprises a TV.

18. A method of operating a mounting device for a display device, the method comprising:
measuring continually the current drawn by a display device mounted on the mounting device;
recording in a memory device values of the current drawn by the display device;
step for determining a ThON current threshold, wherein, when the current drawn by the display device exceeds the current threshold, the display device is considered to be turned on; and
deploying the mounting device to place the display device into a predetermined position in response to the current drawn by the display device exceeding the current threshold.

* * * * *